(12) United States Patent
Watanabe (10) Patent No.: US 9,110,326 B2
(45) Date of Patent: Aug. 18, 2015

(54) LIQUID CRYSTAL DISPLAY DEVICE AND MULTI-DISPLAY SYSTEM

(75) Inventor: Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 62 days.

(21) Appl. No.: 13/990,537

(22) PCT Filed: Nov. 29, 2011

(86) PCT No.: PCT/JP2011/077475
§ 371 (c)(1),
(2), (4) Date: May 30, 2013

(87) PCT Pub. No.: WO2012/073929
PCT Pub. Date: Jun. 7, 2012

(65) Prior Publication Data
US 2013/0242230 A1    Sep. 19, 2013

(30) Foreign Application Priority Data

Dec. 2, 2010    (JP) ................................. 2010-269646

(51) Int. Cl.
*G02F 1/1335*    (2006.01)
*G02F 1/1333*    (2006.01)

(52) U.S. Cl.
CPC ...... *G02F 1/133504* (2013.01); *G02F 1/13336* (2013.01); *G02F 2001/133331* (2013.01)

(58) Field of Classification Search
CPC ........................ G02F 1/13336; G02F 1/133504
USPC ....................................................... 349/64, 73
See application file for complete search history.

(56) References Cited

U.S. PATENT DOCUMENTS

| | | | |
|---|---|---|---|
| 6,124,905 A * | 9/2000 | Iijima | 349/62 |
| 6,445,504 B1 * | 9/2002 | Suga et al. | 359/599 |
| 6,744,480 B2 * | 6/2004 | Kaneko | 349/65 |
| 6,803,978 B2 * | 10/2004 | Bayrle et al. | 349/73 |
| 6,850,296 B2 * | 2/2005 | Liu et al. | 349/113 |
| 6,917,396 B2 * | 7/2005 | Hiraishi et al. | 349/64 |
| 6,927,908 B2 | 8/2005 | Stark | |

(Continued)

FOREIGN PATENT DOCUMENTS

| | | |
|---|---|---|
| JP | 2004-524551 A | 8/2004 |
| JP | 2006-047845 A | 2/2006 |

(Continued)

OTHER PUBLICATIONS

Official Communication issued in International Patent Application No. PCT/JP2011/077475, mailed on Dec. 27, 2011.

(Continued)

*Primary Examiner* — James Dudek
(74) *Attorney, Agent, or Firm* — Keating & Bennett, LLP (57) ABSTRACT

A liquid crystal display device (100) includes a liquid crystal display cell (10), a light-transmitting cover (20) having a lens portion (22) and disposed on a viewer side, a backlight (40) disposed on an opposite side to the viewer side, a light diffusion layer (38) disposed between the backlight (40) and the light-transmitting cover (20), and a refraction-index adjusting layer (28) that fixes the liquid crystal display cell (10) and the light-transmitting cover (20) to each other. A refraction index difference between the light-transmitting cover (20) and the refraction-index adjusting layer (28) is smaller than a refraction index difference between the light-transmitting cover (20) and air.

15 Claims, 9 Drawing Sheets

(56) References Cited

U.S. PATENT DOCUMENTS

| | | | |
|---|---|---|---|
| 6,958,795 B2 * | 10/2005 | Liu et al. | 349/113 |
| 7,443,463 B2 | 10/2008 | Chang et al. | |
| 7,907,112 B2 * | 3/2011 | Chang et al. | 345/98 |
| 8,339,542 B2 * | 12/2012 | Biernath et al. | 349/68 |
| 8,472,114 B2 * | 6/2013 | Watanabe | 359/443 |
| 2006/0038935 A1 * | 2/2006 | Kim | 349/64 |
| 2011/0242686 A1 | 10/2011 | Watanabe | |
| 2012/0069273 A1 | 3/2012 | Watanabe | |

FOREIGN PATENT DOCUMENTS

| | | |
|---|---|---|
| WO | 20101070871 A1 | 6/2010 |
| WO | 20101140537 A1 | 12/2010 |

OTHER PUBLICATIONS

English translation of Official Communication issued in corresponding International Application PCT/JP2011/077475, mailed on Jun. 13, 2013.

* cited by examiner

LIQUID CRYSTAL DISPLAY DEVICE AND MULTI-DISPLAY SYSTEM

TECHNICAL FIELD

The present invention relates to a liquid crystal display device preferably used in a multi-display system.

BACKGROUND ART

A large liquid crystal display device is used as, for example, a display device for amusement facilities, an information display, or digital signage. As the range of uses increases, trials have been conducted of pseudo large screen display devices by arraying multiple liquid crystal display devices (may also be referred to as a tiling technique). A large screen display device having such a configuration is called, for example, a multi-display system. Such a multi-display system, however, has a problem of there being noticeable joints between the multiple display devices.

This problem will be described by taking a liquid crystal display device as an example. A liquid crystal display device includes a liquid crystal display panel, a backlighting device, a circuit and a power source that supply various electric signals to the liquid crystal display panel, and a housing in which the display panel, the backlighting device, the circuit, and the power source are accommodated. The liquid crystal display panel has a display area, in which multiple pixels are arrayed, and a frame area around the periphery of the display area. Pixel electrodes and thin film transistors (TFTs) are arranged in the display area. Components such as a sealing portion, with which a liquid crystal material is sealed between boards, and a driving-circuit mounting portion are arranged in the frame area. Since pixels are not arrayed in the frame area, the frame area does not contribute to display. Although frames of liquid crystal display devices have been progressively made smaller year by year, it is fundamentally impossible to eliminate a frame area.

In a multi-display system formed by tiling multiple liquid crystal display devices, the frame areas of adjacent liquid crystal panels are arranged adjacent to each other, thereby generating joints, at which an image cannot be displayed, at the border between the panels. In view of this circumstance, PTLs 1 and 2 each disclose a display device including a light-transmitting cover disposed on a viewer side of each display panel to display a jointless image.

A viewer-side edge portion of the light-transmitting cover has a curved surface. Since the portion having the curved surface functions as a lens, this portion may also be referred to as a "lens portion" below. The lens portion of the light-transmitting cover is arranged so as to overlap the frame area of the display panel and part of the display area adjacent to the frame area. The part of the display area that is overlapped by the lens portion is referred to as a peripheral display area. Light emitted from pixels arrayed in the peripheral display area is refracted by the lens portion arranged in the frame area in accordance with the shape of the lens surface. Consequently, an image is also displayed on the front side of the frame area and thus a jointless image is displayed over the entire area of the screen.

Figure 1:
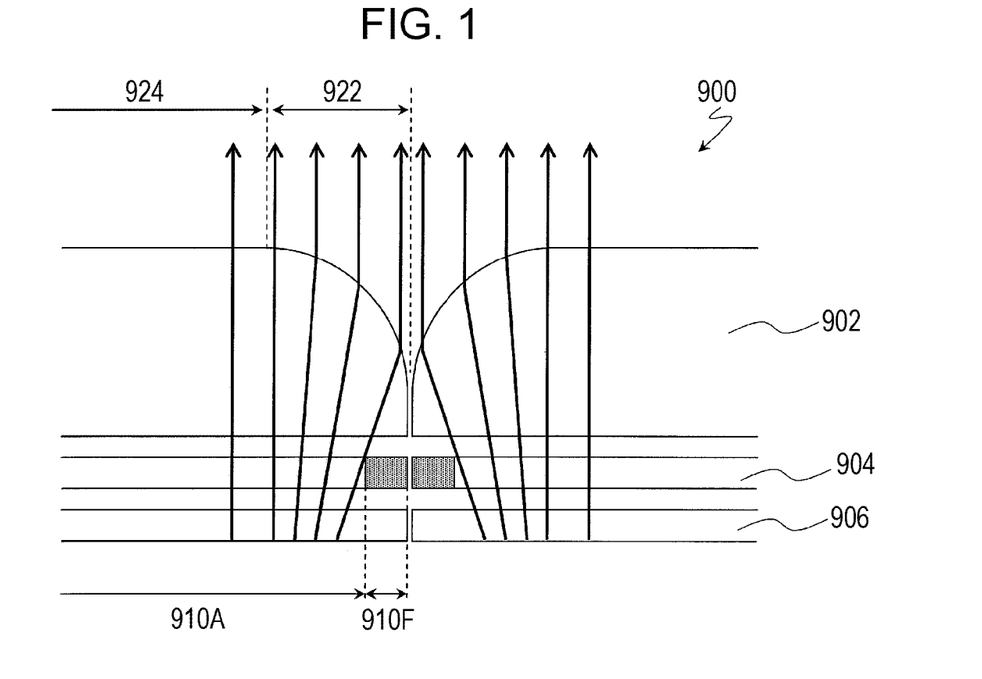
FIG. 1 illustrates a portion in a multi-display system at which display devices are adjacent to each other.

FIG. 1 illustrates the state in which two liquid crystal display devices 900 each having the above-described light-transmitting cover are arranged adjacent to each other. As illustrated, light-transmitting covers 902 are disposed on the display surface side of the two liquid crystal panels 904 arranged side by side. Each light-transmitting cover 902 includes a flat surface portion 924 and a curved surface portion 922, which is located at the edge of the flat surface portion 924 and functions as a lens. Light emitted from backlights 906 is transmitted through the liquid crystal panels 904 and then refracted by the curved surface portions 922 of the light-transmitting covers 902 and emerges toward a viewer. Since the viewer cannot see the frame areas 910F (non-display areas) located on the outer side of the display areas 910A, the screens of the two display devices appear to be continuous with each other.

CITATION LIST

Patent Literature

PTL 1: Japanese Unexamined Patent Application Publication (Translation of PCT Application) No. 2004-524551 (U.S. Pat. No. 6,927,908)

PTL 2: U.S. Pat. No. 7,443,463

SUMMARY OF INVENTION

Technical Problem

When the light-transmitting cover is provided such that the lens portion overlaps the peripheral display area and the frame area of the display panel, the frame area of the display panel can be made harder to see. However, after the inventor studied a display device including such a light-transmitting cover in detail, the inventor found that the quality of display is low when the panel is viewed from an inclined direction at an angle larger than or equal to a predetermined angle unlike in the case where the panel is viewed from the front.

The present invention is made to solve the above problem. An object of the present invention is to provide a liquid crystal display device that can display a preferable image in which joints are unnoticeable even when viewed from an inclined direction and that is preferably used in a multi-display system.

Solution to Problem

A liquid crystal display device according to an embodiment of the present invention includes a liquid crystal display cell; a light-transmitting cover disposed on a viewer side of the liquid crystal display cell, the light-transmitting cover having a lens portion; a backlight disposed on an opposite side of the liquid crystal display cell to the viewer side; a light diffusion layer disposed so as to be positioned between the backlight and the light-transmitting cover; and a refraction-index adjusting layer disposed between the liquid crystal display cell and the light-transmitting cover, the refraction-index adjusting layer fixing the liquid crystal display cell and the light-transmitting cover to each other, a refraction index difference between the refraction-index adjusting layer and the light-transmitting cover being smaller than a refraction index difference between the light-transmitting cover and air.

In an embodiment, the light diffusion layer is positioned between the backlight and the liquid crystal display cell.

In an embodiment, a liquid crystal display device further includes a pair of polarizing plates, one positioned on each of both sides of the liquid crystal display cell. The light diffusion layer is positioned between the backlight and the polarizing plate disposed on the backlight side of the liquid crystal display cell.

In an embodiment, a haze value of the light diffusion layer is 30% or larger but 90% or smaller.

In an embodiment, in the light diffusion layer, degrees of light diffusion are different in two intersecting directions.

In an embodiment, the lens portion of the light-transmitting cover extends in a first direction along a surface of the liquid crystal display cell and the light diffusion layer is disposed such that one of the two intersecting directions in which the degree of light diffusion is larger is orthogonal to the first direction.

In an embodiment, the light-transmitting cover has a slope portion that is continuous with the lens portion and the light-transmitting cover only covers a portion of the liquid crystal display cell.

In an embodiment, the light-transmitting cover is made of a silicone gel.

A multi-display system according to an embodiment of the present invention includes a plurality of liquid crystal display devices each being any one of the above liquid crystal display devices and the plurality of liquid crystal display devices are arranged adjacent to each other.

Advantageous Effects of Invention

When a multi-display system is formed by using liquid crystal display devices according to any of the embodiments of the present invention, the multi-display system can preferably display an image even when viewed from an inclined direction.

BRIEF DESCRIPTION OF DRAWINGS

FIG. 9 illustrates configurations of the liquid crystal display device according to the first embodiment and FIGS. 9(a) to 9(e) illustrate different configurations in which a light diffusion layer is arranged at different positions.

DESCRIPTION OF EMBODIMENTS

When the configuration in which liquid crystal panels each having a light-transmitting cover having a lens portion are arranged adjacent to each other is viewed from an inclined direction, there are some problems in that the lens portion is dim and that ambient light is viewed by being reflected off the panels. The inventor's consideration of the cause of these problems is firstly described.

Figure 2:
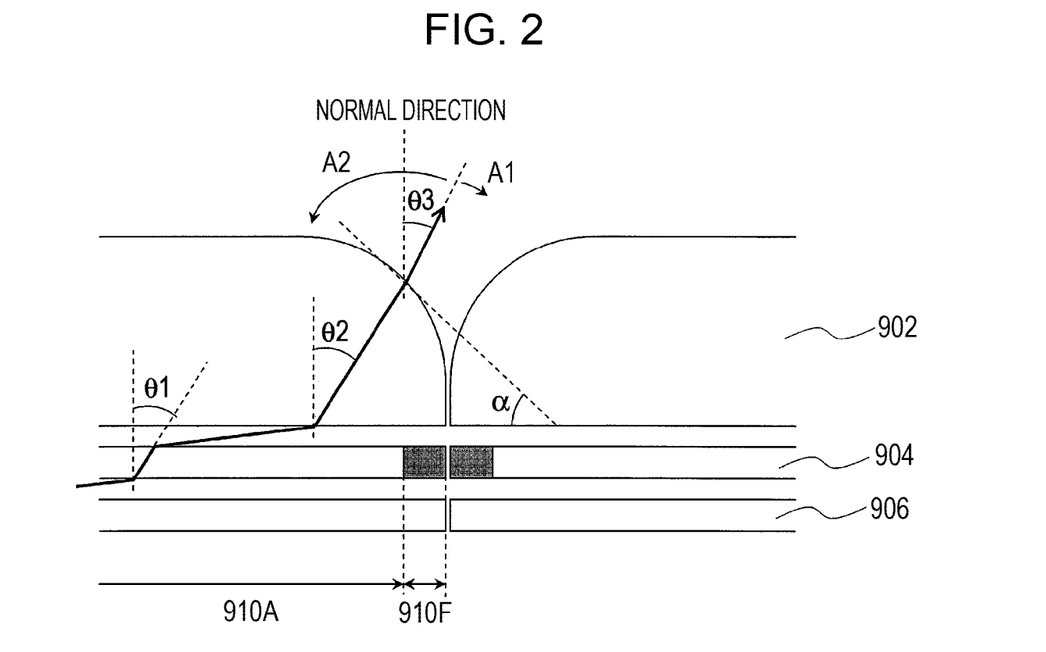
FIG. 2 illustrates a range of a display angle of a multi-display system including existing display devices.

FIG. 2 illustrates a panel adjoining area, at which display devices are adjacent to each other, in an enlarged manner. When a viewing direction is gradually inclined from the front direction and reaches a certain angle, display suddenly becomes unviewable at a border portion between the panels. This is a problem unique to the edge portion of the light-transmitting cover having a curved surface. According to Snell's law, the angle of the direction in which light travels changes at the interface between different materials (media) having different indexes of refraction. Light that is incident on a material having a flat shape and having an index n of refraction at an angle not smaller than the following critical angle θ is totally reflected:

critical angle $\theta = \sin^{-1}(1/n)$.

Typical glass or acrylic resin has an index of refraction of approximately 1.5. Here, the critical angle is approximately 42°. In FIG. 2, the surface of the liquid crystal panel 904 is made of glass and the light-transmitting cover 902 is made of acrylic resin. Thus, the critical angles θ1 and θ2 are approximately 42°. According to Snell's law, a border angle (critical angle) θ3 beyond which display becomes unviewable is determined by an inclination (angle of inclination) α of the curved surface portion. A displayed image is viewable within an angle range A2 below or equal to the critical angle θ3 but a displayed image is unviewable within an angle range A1 above the critical angle θ3.

Figure 3:
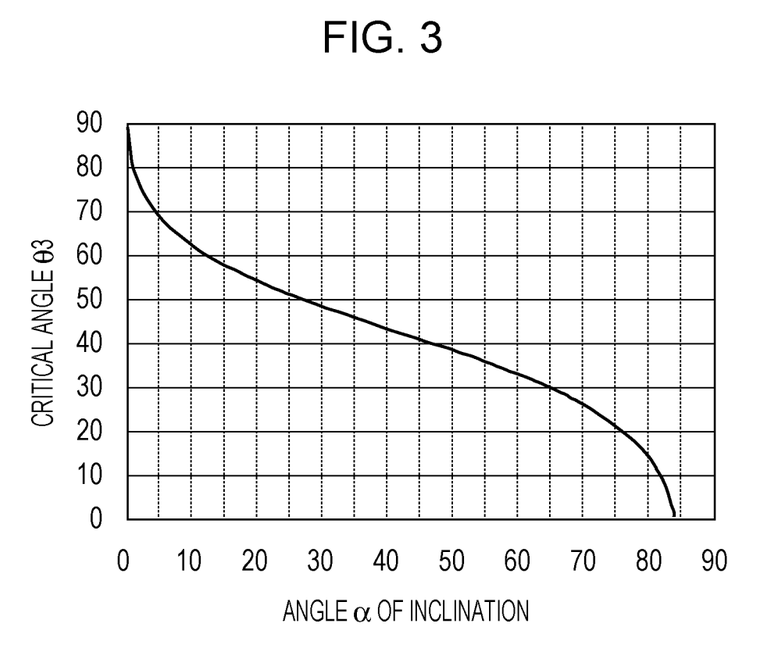
FIG. 3 illustrates a relationship between an angle α of inclination and a critical angle θ3 of a lens portion.
Figure 4:
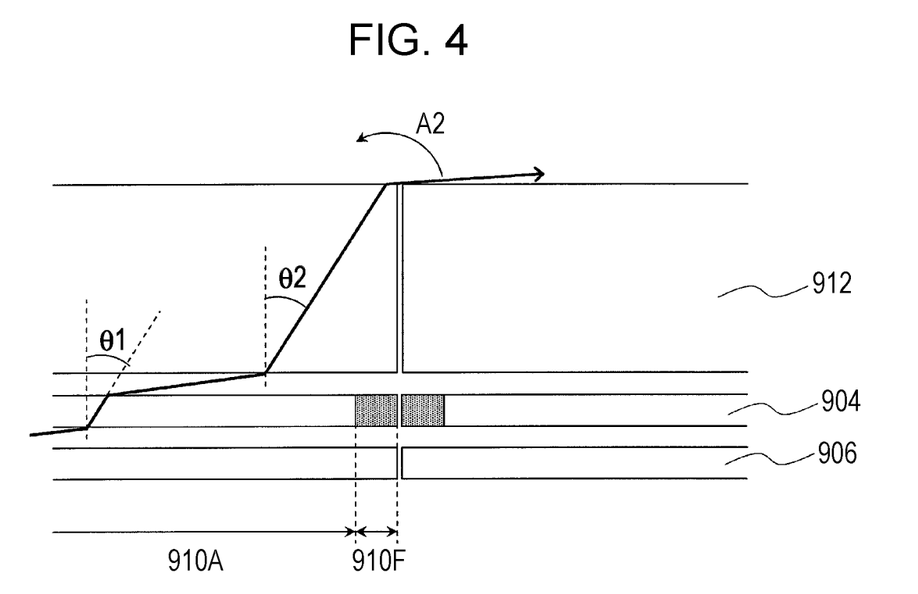
FIG. 4 illustrates a range of a display angle of a multi-display system including existing display devices having another configuration.

FIG. 3 is a graph illustrating the relationship between the angle α of inclination and the critical angle θ3 when the light-transmitting cover 902 is made of acrylic resin. As is understood from the graph, when α=0°, that is, when a light-transmitting cover has no curved surface portion and only has a flat surface portion, θ3=90°, thus display is viewable at any angle (see FIG. 4). As illustrated in FIG. 4, typical display devices having a light-transmitting protective cover often have a configuration in which a protective cover 912 has no curved surface portion. On the other hand, when α>0°, the critical angle θ3<90°, and thus display is unviewable at an angle above the critical angle θ3.

This is the reason why display at the panel adjoining portion is not adequately viewable from an inclined direction when the light-transmitting cover 902 has a curved surface portion. The angle α of inclination continuously changes in the curved surface portion and becomes the largest at an adjoining area (at the edges of display devices) at which display devices adjoin to each other. Thus, the adjoining area at which display devices adjoin to each other has the lowest angle characteristics.

Figure 5:
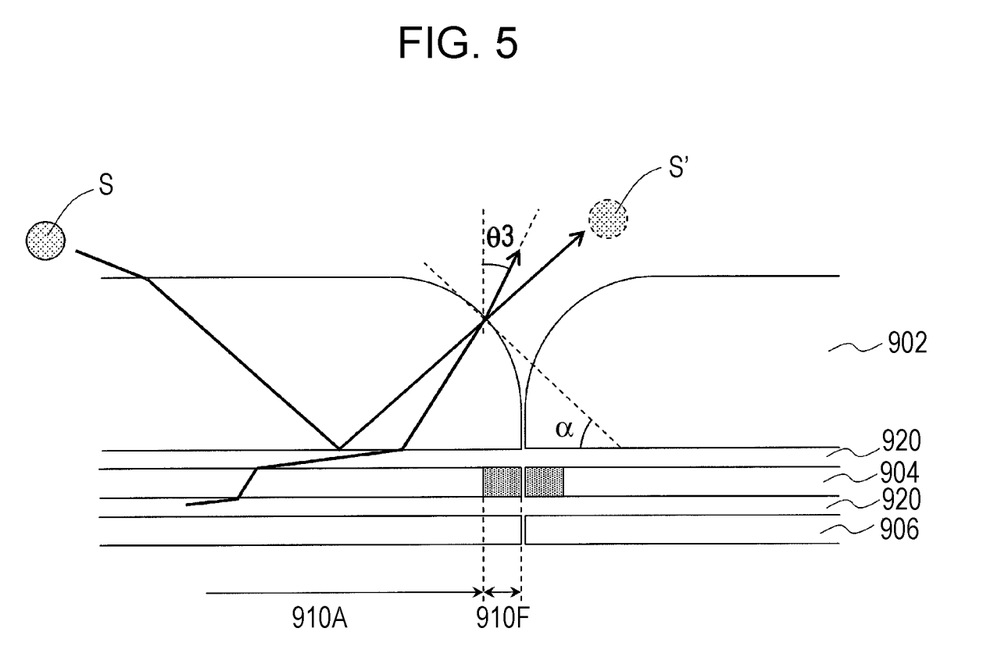
FIG. 5 illustrates reflection of outdoor light in a multi-display system including existing display devices.

As illustrated in FIG. 5, when display is viewed from an angle larger than or equal to the critical angle θ3, ambient light (outdoor light) is totally reflected off a display-device-side surface of the light-transmitting cover 902. The total reflection is caused because the index of refraction of the light-transmitting cover 902 is considerably different from that of an air space 920. When a light source S such as sunlight or a fluorescent lamp is located in such a direction that light from the light source S is totally reflected, the display glares because of the reflection of light from the light source S. Thus, it is found that, when the display is viewed from an angle larger than or equal to the critical angle θ3, not only the display is totally unviewable, but a reflection S' of light from the light source S may be generated, thereby considerably reducing the quality of the display.

As described above, even with the technique of arranging a lens member on display devices to make a frame area harder to see, existing display devices have problems in that the lens portion is dim and that ambient light is viewed by being reflected when viewed from an inclined direction although screens appear to be continuous when viewed from the front direction of the display surface. To solve the above problems, the inventor has studied a liquid crystal display device that can provide appropriate display even when viewed from an inclined direction and that is preferably used in a multi-display system. The present invention has thus been completed. Hereinbelow, embodiments of the present invention are described with reference to the drawings.

First Embodiment

Figure 6:
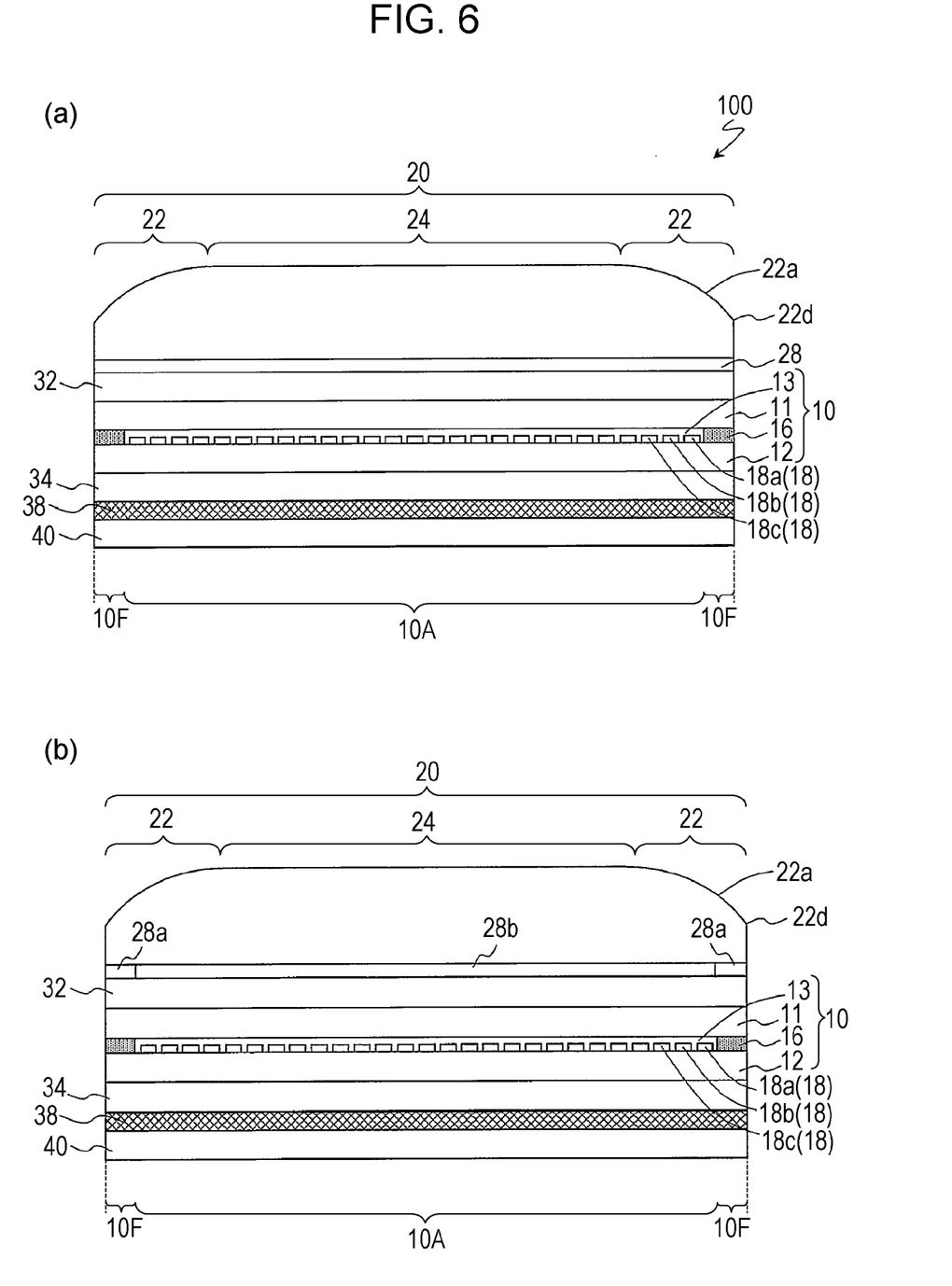
FIG. 6(a) illustrates a liquid crystal display device according to a first embodiment of the present invention and FIG. 6(b) illustrates a liquid crystal display device formed by bonding in a different manner.

FIG. 6(a) schematically illustrates a cross section of a liquid crystal display device 100 according to a first embodiment. The liquid crystal display device 100 is transparent and includes, as illustrated in FIG. 6(a), a liquid crystal display cell 10, a light-transmitting cover 20 disposed on a viewer side of the liquid crystal display cell 10, and a backlight 40 disposed on the opposite side of the liquid crystal display cell 10 to the viewer side.

The liquid crystal display device 100 includes a viewer-side polarizing plate 32 and a backlight-side polarizing plate 34 on both sides of the liquid crystal display cell 10. The polarizing plates 32 and 34 are typically arranged such that their polarization axes are orthogonal to each other. In this description, a unit consisting of the liquid crystal display cell 10 and optical film layers such as the polarizing plates 32 and 34 disposed on both sides of the liquid crystal display cell 10 may be referred to as a liquid crystal panel.

As examples of the liquid crystal display cell 10 and the backlight 40, those employed in a liquid crystal display device PN-V601 sold by the applicant can be used. In this liquid crystal display device, in a multi-display configuration, the frame width (the sum of two sides) is approximately 6.5 mm and an interval of non-display area is approximately 7.1 mm. The liquid crystal display device is of 60-inch class and has a size of 1335.9 mm in width×754.2 mm in height.

The liquid crystal display cell 10 includes a TFT board 12 and an opposing board 11 and a liquid crystal layer 13 is sealed with a sealing portion 16 between the TFT board 12 and the opposing board 11. Thin film transistors (TFT) and pixel electrodes 18' are disposed on the TFT board 12. A color filter layer 15 and opposing electrodes (common electrodes) 14 are disposed on the opposing board 11 (see FIG. 7(a)). FIG. 6(a) is a cross sectional view of the liquid crystal display device 100 taken along a plane perpendicular to a column direction of pixels (direction perpendicular to the plane of FIG. 6(a)). FIG. 6(a) illustrates cross sections of multiple pixels arrayed in a row direction (direction parallel to the plane of FIG. 6(a)).

A display area 10A and frame areas 10F located on the outer side of the display area 10A are defined in the liquid crystal display cell 10. In the display area 10A, multiple pixels are arrayed in a matrix. In each frame area 10F, the sealing portion 16, driving circuits, and other components are formed. In FIG. 6(a), each frame area 10F is illustrated as an area that corresponds to an area positioned at an edge portion of the liquid crystal display cell 10 in which the sealing member 16 is formed, but the frame area 10F is not limited to this configuration. For example, an extended portion of the TFT board 12, a driving circuit disposed on the extended portion, or other components may be provided on the outer side of the sealing member 16, and the area that does not contribute to display may also be included in the frame area 10F.

Between the display area 10A and each frame area 10F, a border extends in the column direction of pixels. Multiple pixel columns 18 include a first pixel column 18a, which is adjacent to a border between the display area 10A and one of the frame areas 10F, a second pixel column 18b, which is adjacent to the first pixel column 18a, and a third pixel column 18c, which is adjacent to the second pixel column 18b. The first pixel column 18a, the second pixel column 18b, and the third pixel column 18c have different colors. For example, the color of the first pixel column 18a is blue, the color of the second pixel column 18b is green, and the color of the third pixel column 18c is red. In short, a pixel array of the liquid crystal display cell 10 is an RGB vertical stripe array.

The pixel array of the liquid crystal display cell 10 may include, not only the above-described three colors of R, G, and B, but four colors of R, G, B, and Y (yellow) or R, G, B, and W (white) or more colors. In addition, the pixel array may have any array pattern such as a delta array.

The light-transmitting cover 20 includes lens portions (curved surface portions) 22 and a flat-board portion 24. The lens portions 22 extend in a direction in which the pixel columns extend. The lens portions 22 are each positioned so as to overlap an area including the corresponding frame area 10F of the liquid crystal panel and a corresponding peripheral display area of the display area 10A that is adjacent to the frame area 10F.

Figure 7:
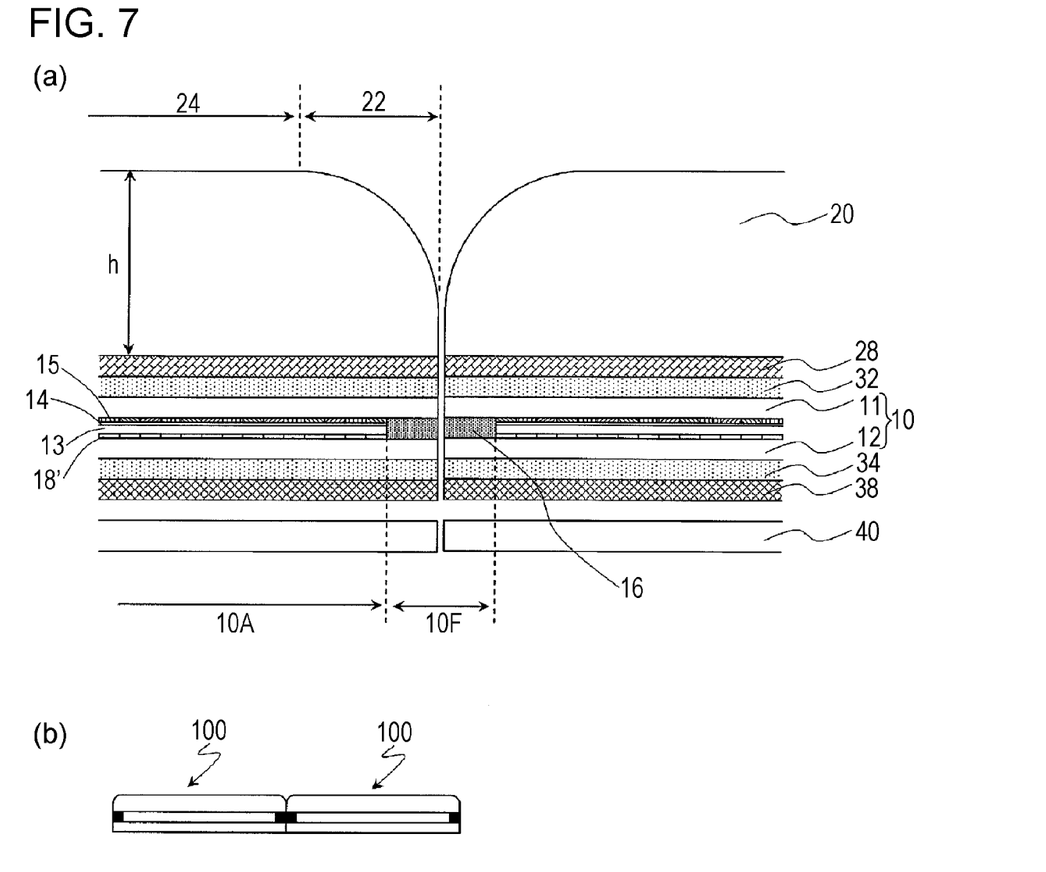
FIG. 7(a) illustrates an adjacent portion at which liquid crystal display devices according to the first embodiment are arranged adjacent to each other in an enlarged manner and FIG. 7(b) illustrates the entire configuration of the liquid crystal display devices.

FIGS. 7(a) and 7(b) illustrate a configuration of a multi-display system in which liquid crystal display devices 100 are arranged side by side. Light emitted from one of the display areas 10A is refracted at the lens portion 22 of the corresponding light-transmitting cover 20 in accordance with the lens shape. Consequently, part of the image formed in the peripheral display area of the display area 10A is displayed over an area above the corresponding frame area 10F in an enlarged manner. In this manner, by providing the light-transmitting cover 20 having the lens portion 22 on the viewer side of the liquid crystal panel, the frame area 10F can be made hard to see.

In the case, for example, where a light-transmitting cover 20 is provided in the above-described 60-inch liquid crystal display device (PN-V601), the thickness h of the flat portion 24 is set to approximately 15 mm and the width of each lens portion is set to approximately 16.4 mm. The radius of curvature of each lens portion 22 is set to approximately 22.4 mm and the aspheric coefficient is set to approximately 0.75.

The light-transmitting cover 20 is prepared in, for example, a manner described below. Firstly, an end surface of an acrylic board having a thickness of 15 mm is processed into a predetermined curved surface by using a cutting device. If needed, the surface is subjected to an operation such as grinding, so that the surface becomes smooth.

The light-transmitting cover 20 thus obtained is bonded to the polarizing plate 32 on the liquid crystal display cell 10. For example, optical elastic resin SVR7000 series manufactured by Sony Chemical & Information Device Corporation can be used for bonding. The above-described resin is dropped on the liquid crystal panel (the liquid crystal display cell 10 and the polarizing plate 32) and then the light-transmitting cover 20 is gently bonded to the liquid crystal panel under vacuum. Thereafter, ultraviolet light is emitted thereto so that the light-transmitting cover 20 is bonded to the liquid crystal panel by curing the resin.

In this manner, the surface of the liquid crystal panel (the surface of the polarizing plate 32) and the back surface of the light-transmitting cover 20 are bonded together by using a material, such as a resin material, while air bubbles are prevented from occurring therebetween. In this embodiment, a material that easily transmits light and that has an index of refraction approximate to the indexes of refraction of the light-transmitting cover 20 and to the index of refraction (typically around 1.5) of a member disposed on the outermost surface of the liquid crystal panel (the polarizing plate 32, for example) is used for bonding. For example, the liquid crystal panel and the light-transmitting cover 20 are bonded together by using a material such as a double-sided adhesive sheet, a silicone gel, or a liquid adhesive while an air space is prevented from being generated therebetween. An adhesive layer (refraction-index adjusting layer) 28 formed between the liquid crystal panel and the light-transmitting cover 20 has functions of adjusting an index of refraction and preventing light from being reflected at the interface.

Multiple materials described above may be collectively used as a material with which the light-transmitting cover 20 and the liquid crystal panel are bonded together. For example, as illustrated in FIG. 6(b), the areas corresponding to the frame areas 10F may be bonded by using a double-sided adhesive sheet 28a having a high adhesive strength while the area corresponding to the display area 10A may be bonded by using a double-sided adhesive sheet 28b having a low adhesive strength. With this configuration, in the case where a defect occurs during a bonding operation, the entirety of the bonded surfaces can be easily detached from each other by only removing the double-sided adhesive sheet 28a. Thus, this configuration is advantageous in that it is easily reworked. Naturally, the borders between the double-sided adhesive sheets 28a and 28b do not have to coincide with the borders between the frame areas 10F and the display area 10A and may be set at any position in accordance with a desired bonding strength or other conditions.

For the same reason, the adhesion of the display surface of the liquid crystal panel may be made to vary over the surface area. For example, only an area of the surface of the viewer-side polarizing plate 32 corresponding to the display area 10A may be coated with fluorine to reduce the adhesion, so that the liquid crystal panel can be easily reworked. Examples of fluorine coating materials include Fluoro Surf manufactured by Fluoro Technology.

In the embodiment, since a solid acrylic resin is used as a material of the light-transmitting cover 20, it is desirable that the light-transmitting cover 20 be bonded under vacuum so that air bubbles are prevented from being generated. However, vacuum bonding is time consuming and not applicable to mass production. In addition, vacuum bonding requires a vacuum chamber of a size compatible with the size of the display device. Thus, in the case of a particularly large display device, vacuum bonding may cause a problem of an excessive increase in size of the entire device.

On the other hand, in the case where a soft material such as a silicone gel is used as the light-transmitting cover 20, the light-transmitting cover 20 can be easily bonded while air is pushed out by using a roller or the like. When α gel manufactured by Taica Corporation is used as a material of a silicone gel, a light-transmitting cover that has a transparency equivalent to that of acrylic resin and that can be easily bonded can be obtained. As described above, by changing the material of the light-transmitting cover to a gel material, the difficulties in bonding the cover may be overcome.

It is preferable that the difference between the index of refraction of the light-transmitting cover and the index of refraction of each of the ultraviolet curable resin layer and the adhesive material such as the double-sided adhesive sheet (refraction-index adjusting layer 28) used here fall within 0.2 or, more preferably, within 0.1. With this configuration, reflection at the interface between the viewer-side outermost surface of the liquid crystal panel and the liquid-crystal-panel-side surface of the light-transmitting cover 20 is reduced to approximately 0.1% or lower, thereby improving the display quality. Here, various materials with which the refraction index difference between the light-transmitting cover 20 and the refraction-index adjusting layer 28 becomes smaller than the refraction index difference between the light-transmitting cover 20 and air can be used for the refraction-index adjusting layer 28. By using such a material, reflection at the interface can be reduced further than in the case where an air space is formed instead of the refraction-index adjusting layer 28. The refraction-index adjusting layer 28 typically has an index of refraction that is larger than that of air but lower than or equal to that of the light-transmitting cover 20.

The liquid crystal display device 100 has a light diffusion layer 38 on the outer side, facing the backlight 40, of the polarizing plate 34. The light diffusion layer 38 diffuses light emitted from the backlight 40. The backlight 40 may be an edge-light type backlight including, for example, an LED, a light guiding plate, and an optical sheet such as a diffusion plate or a prism sheet.

The light diffusion layer 38 can be manufactured by using, for example, a diffusion film. The diffusion film is bonded to the outer side (backlight 40 side) of the polarizing plate 34 in advance via an adhesive layer, and this laminated body is bonded to the liquid crystal display cell 10. Thus, the light diffusion layer 38 positioned between the backlight 40 and the liquid crystal display cell 10 is obtained.

Preferably, the haze value of the diffusion film is in a range from 30 to 90%. The haze value that is too small (less than 30%, for example) is not preferable because diffusion effect is weak and thus light cannot be diffused at an angle larger than or equal to the critical angle. If, on the other hand, the haze value is too large (over 90%, for example), the luminance on the front surface may become too low. Thus, it is preferable that the haze value of the light diffusion layer 38 fall within 30% to 90%, inclusive, more preferably, 50% to 90%, inclusive.

Here, "haze value" is a value indicating "the turbidity". The haze value is defined by the following equation:

$$\text{haze value}(\%) = (Td/Tt) \times 100,$$

where the total light transmittance is denoted by Tt (%) and the diffusion transmittance is denoted by Td (%).

Here, the total light transmittance Tt is a ratio of the sum of the intensity of diffused transmitted light and the intensity of light transmitted in parallel to the intensity of incident light (parallel light). The diffusion transmittance Td is a ratio of the intensity of diffused transmitted light to the intensity of incident light (parallel light). The lightness of the light diffusion layer increases as the haze value is smaller, while the turbidity of a light diffusion layer increases as the haze value is larger. Here, the haze value of the light diffusion layer is measured by using an integrating-sphere light transmittance measuring device (for example, a haze meter NDH2000 manufactured by Nippon Denshoku Industries Co., Ltd.).

Examples usable as a diffusion film include light diffusion films D123 and D114 manufactured by Tsujiden Co., Ltd. Alternatively, the light diffusion layer 38 may be formed by performing anti-glaring or by using a lens diffusion plate manufactured by Luminit LLC.

The light diffusion layer 38 only has to be the one that emits light, which has been incident thereon, within an angle range larger than the incident angle range. The light diffusion layer 38 may emit light by using any of light scattering, diffused reflection, and refraction.

The range of distribution of an angle of light emitted from the light diffusion layer 38 (degree of light diffusion) can also be measured by using, for example, a half angle (FWHM) of distribution of intensity of light emitted from the light diffusion layer 38. The half angle denotes an angle range of emitted light at which the intensity of light is ½ or larger than the intensity of light emitted in the normal direction. In this embodiment, a preferable half angle of the light diffusion layer 38 is 10° or larger and more preferably 20° or larger. With this distribution, light can be emitted also at angles larger than or equal to the critical angle of the light-transmitting cover. On the other hand, when the degree of light diffusion increases, the frontward luminance decreases although the viewing angle property improves. Thus, in terms of luminance, the half angle is preferably 30° or smaller and more preferably, 20° or smaller. The degree of light diffusion of the light diffusion layer 38 can be appropriately selected in accordance with its purpose of use.

Figure 8:
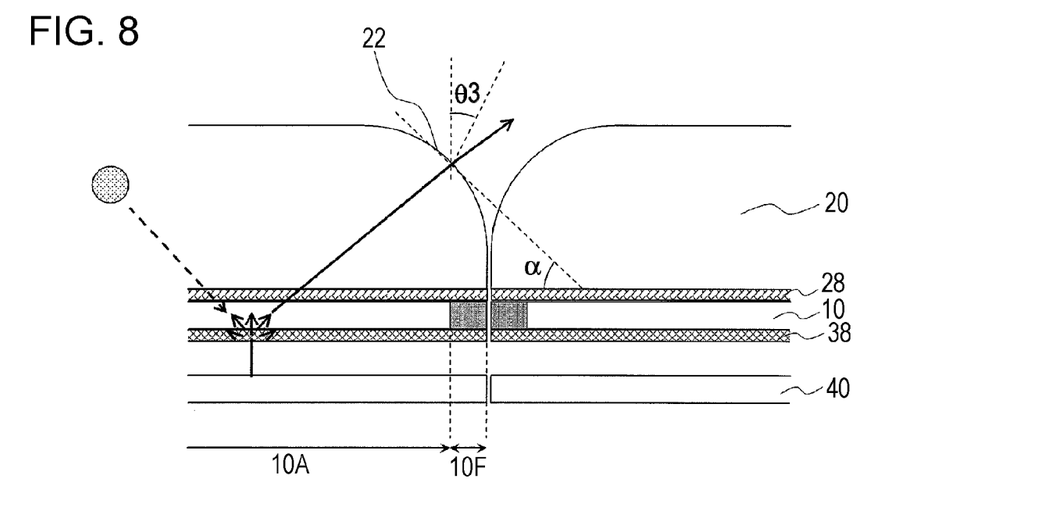
FIG. 8 illustrates an optical path in the liquid crystal display device according to the first embodiment.

In this embodiment, since the light diffusion layer 38 is interposed between the liquid crystal display cell 10 and the backlight 40, as described above, light from the backlight 40 is diffused. Thus, as illustrated in FIG. 8, light is incident on the lens portion 22 of the light-transmitting cover 20 from the backlight 40 at an angle different from that in the case where the light diffusion layer 38 is not provided. Such light is emitted also in a direction that is at an angle larger than the critical angle θ3 determined by an angle (angle of inclination) α formed between the tangential direction of a cross section of the lens portion and the panel surface 12. Consequently, the lens portion is prevented from becoming dim even when a viewer views the lens portion from an inclined direction at an angle larger than the critical angle θ3.

In addition, the liquid crystal display cell 10 and the light-transmitting cover 20 are bonded together without a medium that changes the index of refraction to a large extent, such as air, interposed therebetween. The refraction-index adjusting layer 28 made of a material such as a cured bonding resin material is interposed between the liquid crystal display cell 10 and the light-transmitting cover 20. If there is an air space at the back of the light-transmitting cover 20, light is totally reflected at the interface between the air space and the light-transmitting cover 20 due to the refraction index difference. When the refraction-index adjusting layer 28 is provided, on the other hand, light is prevented from being reflected at the back surface of the light-transmitting cover 20. Light that has passed through the refraction-index adjusting layer 28 is absorbed by the liquid crystal panel, typically including a pair of polarizing plates 32 and 34 arranged in a crossed Nicols manner, and thus is not reflected. In this manner, reflection of outdoor light is effectively prevented from occurring. Preferably, the refraction-index adjusting layer 28 has an index of refraction at which light is prevented from being totally reflected at the interface between the refraction-index adjusting layer 28 and the viewer-side polarizing plate 32.

As described above, the outer side of the backlight-side polarizing plate 34 disposed on the back side of the liquid crystal display cell 10 is the most preferable place for the light diffusion layer 38 to be disposed on. However, the light diffusion layer 38 may be disposed at another place.

Figure 9:
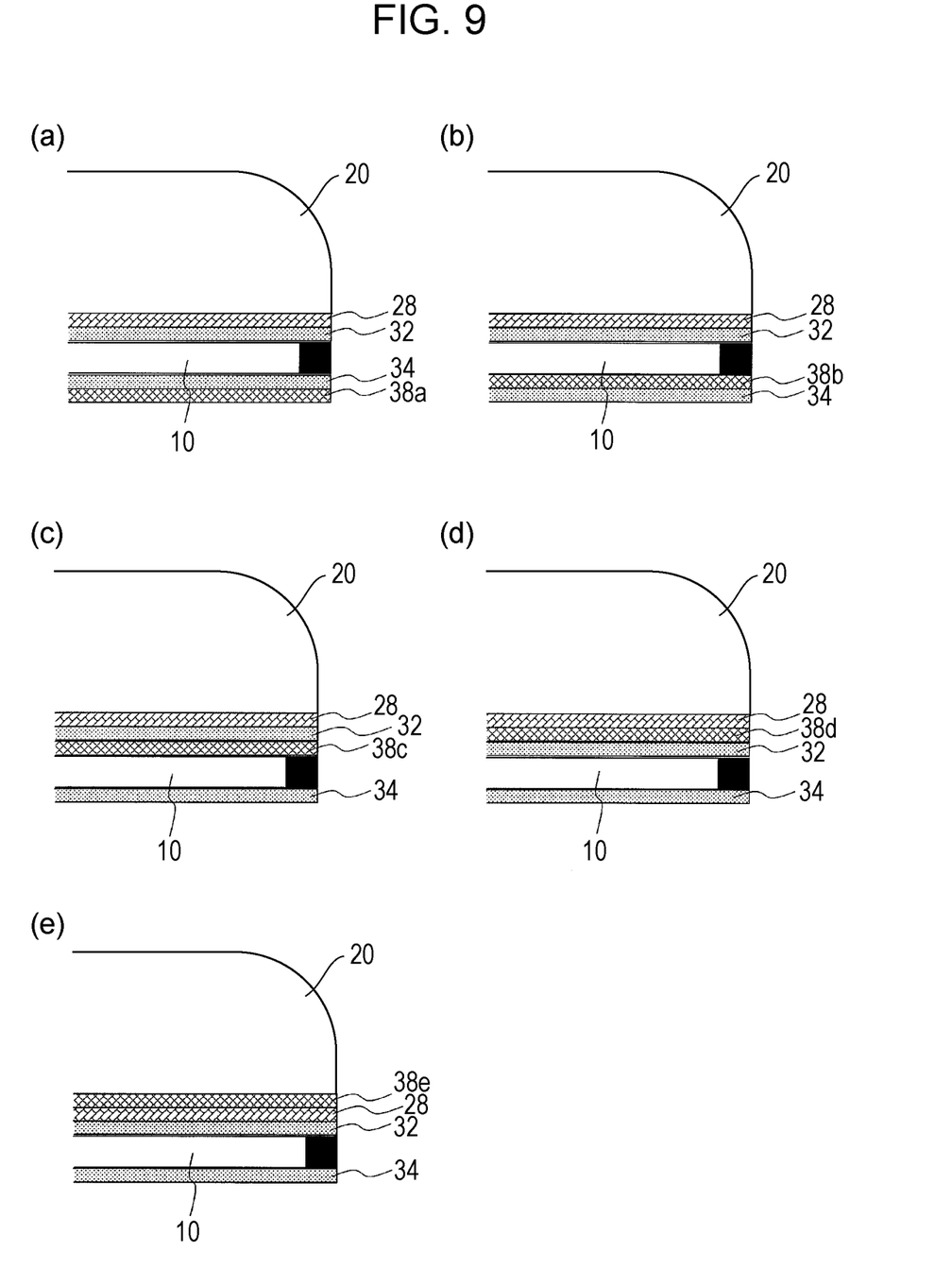

For example, instead of the configuration in which the light diffusion layer 38a is disposed on the outer side of the backlight-side polarizing plate 34 as illustrated in FIG. 9(a), a light diffusion layer 38b may be interposed between the backlight-side polarizing plate 34 and the liquid crystal display cell 10 as illustrated in FIG. 9(b). Alternatively, as illustrated in FIG. 9(c), a light diffusion layer 38c may be interposed between the viewer-side polarizing plate 32 and the liquid crystal display cell 10. Alternatively, as illustrated in FIG. 9(d), a light diffusion layer 38d may be interposed between the viewer-side polarizing plate 32 and the refraction-index adjusting layer 28. Alternatively, as illustrated in FIG. 9(e), a light diffusion layer 38e may be interposed between the refraction-index adjusting layer 28 and the light-transmitting cover 20.

In the configurations illustrated in FIGS. 9(a) to 9(d), the light diffusion layers and the polarizing plate can be manufactured in an integrated manner. Thus, advantageously, a liquid crystal display device can be easily manufactured by bonding this integrated body to the liquid crystal display cell 10. Even in the configuration illustrated in FIG. 9(e), by forming projections and depressions on the back surface of the light-transmitting cover 20 and using the projections and depressions as a light diffusion layer, the light-transmitting cover 20 and the light diffusion layer can be formed in an integrated manner. In FIGS. 9(a), 9(d), and 9(e), the light diffusion layer is not interposed between the polarizing plate and the liquid crystal display cell and thus the state of polarization of light passing through the liquid crystal display cell is not changed due to diffusion. Thus, the contrast or tone of display is prevented from being reduced. Moreover, in the configurations illustrated in FIGS. 9(a) to 9(c), outdoor light is incident on the diffusion layer via a polarizing plate. Since outdoor light is absorbed by the polarizing plate, backscattering of the outdoor light in the diffusion layer can be prevented. For this reason, these configurations are particularly effective in preventing reduction of the contrast at a bright place at which outdoor light is strong.

International Publication No. 2010/140537 filed by the applicant describes a technology with which a light diffusion layer is interposed between a display panel and a light-transmitting cover having a lens. The entire content of International Publication No. 2010/140537 is incorporated herein by reference. A light diffusion structure or a light-transmitting cover described in International Publication No. 2010/140537 can be used as the light diffusion layer or the light-transmitting cover according to the present invention.

Second Embodiment

Figure 10:
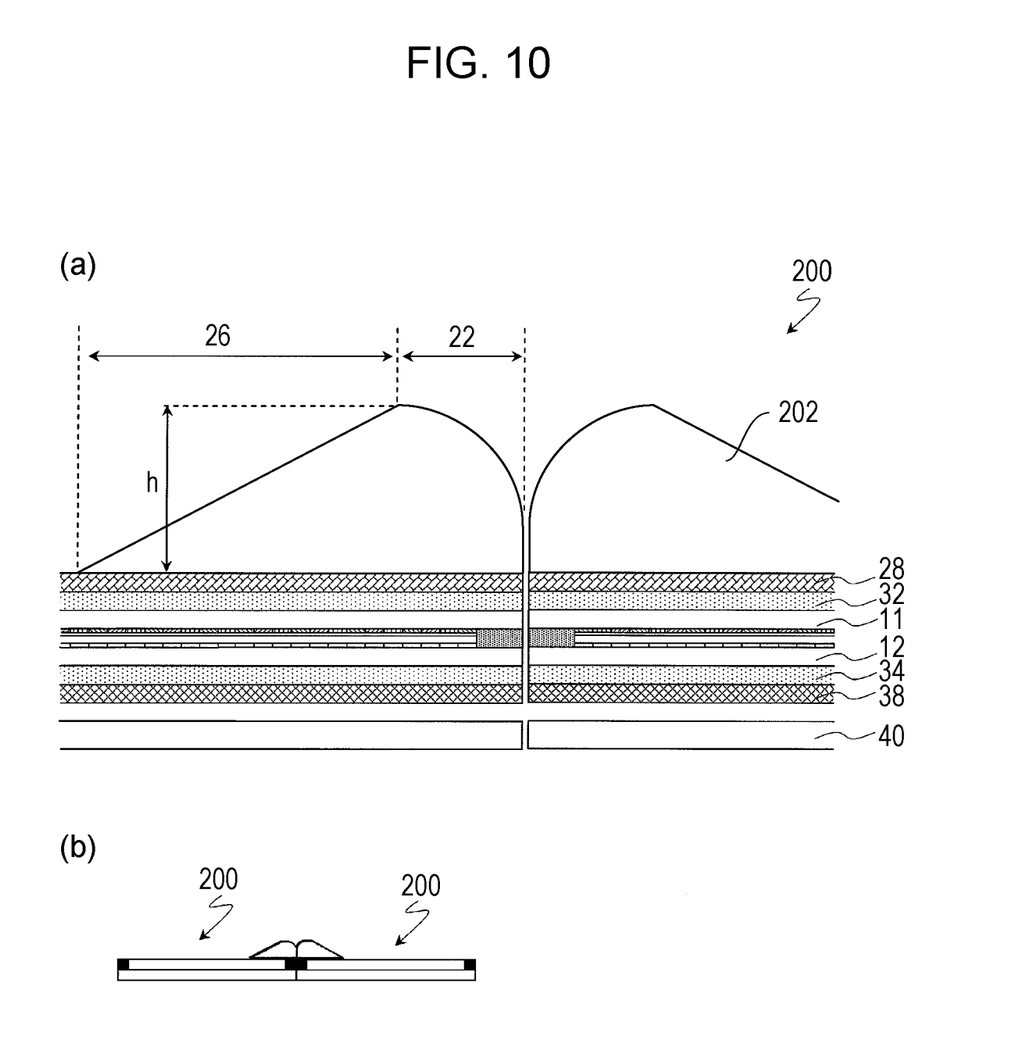
FIG. 10(a) illustrates an adjacent portion at which liquid crystal display devices according to a second embodiment of the present invention are arranged adjacent to each other in an enlarged manner and FIG. 10(b) illustrates the entirety of the liquid crystal display devices.

FIGS. 10(a) and 10(b) illustrate a configuration of a multi-display system including liquid crystal display devices 200 according to a second embodiment. In this embodiment, the configuration of a light-transmitting cover is different from that of the liquid crystal display device 100 according to the first embodiment but the configurations of other components are the same as those of the liquid crystal display device 100. In this embodiment, light-transmitting covers 202 are selectively arranged at peripheral portions (edge portions) of a liquid crystal panel. Components that are the same as those according to the first embodiment are denoted by the same reference symbols and are not described.

As illustrated, each light-transmitting cover 202 has a lens portion (curved surface portion) 22 and a slope portion 26 that is continuous with the lens portion 22. In this embodiment, the light-transmitting covers 202 do not cover the entirety of the liquid crystal panel but are only arranged over adjacent areas at which liquid crystal panels are adjacent to each other. Although the light-transmitting covers 202 only cover portions of the liquid crystal display cell 10, the light-transmitting covers 202 are called light-transmitting covers herein.

When a 60-inch liquid crystal display device (PN-V601) is used as in the case of the first embodiment, the height h of the cover at the border between each slope portion 26 and the corresponding lens portion 22 is set at 15 mm. The width of each lens portion 22 is set at 16.4 mm and the radius of curvature of the lens portion 22 is set at 22.4 mm. The aspheric coefficient is set at 0.75. The width of each slope portion 26 is set at 60 mm.

In the embodiment, the amount of material required to form the light-transmitting covers 202 and the weight of the liquid crystal display device can be considerably reduced. For example, in the case of a 60-inch size panel, the weight of the light-transmitting covers can be reduced from 18 kg to 1 kg. Particularly, in the case of a large panel as in the case of the embodiment, reduction of weight of the light-transmitting covers is significant.

Third Embodiment

Figure 11:
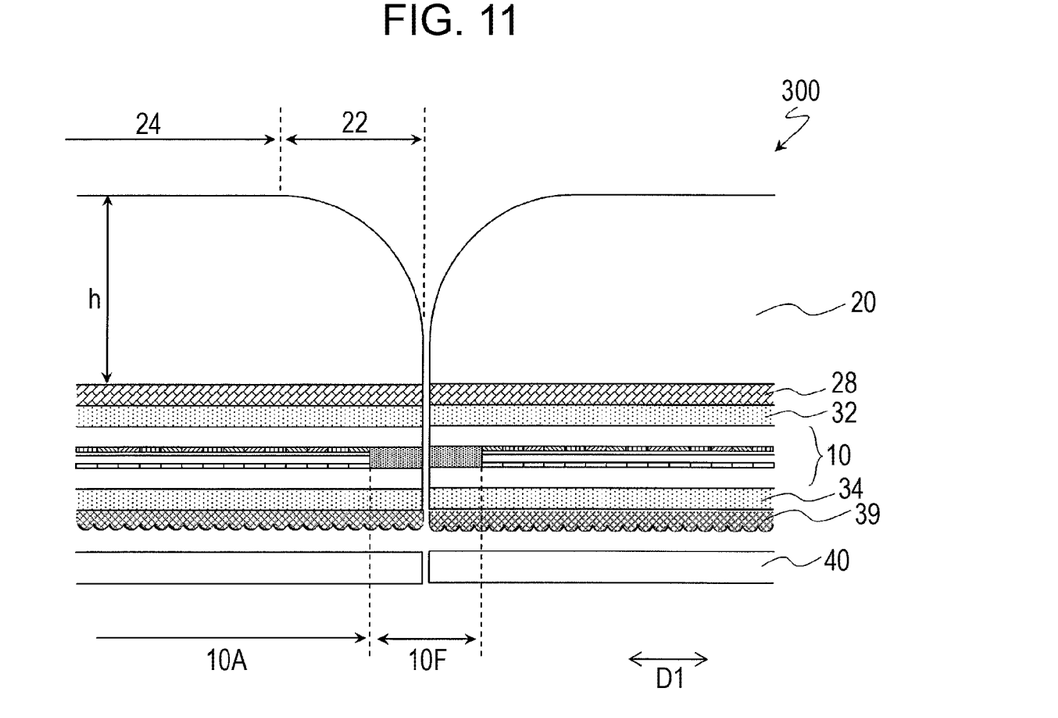
FIG. 11 illustrates an adjacent portion at which liquid crystal display devices according to a third embodiment of the present invention are arranged adjacent to each other in an enlarged manner.

FIG. 11 illustrates a configuration of a multi-display system including liquid crystal display devices 300 according to a third embodiment. In this embodiment, a configuration in which a lenticular lens 39 is used as a light diffusion layer is described. The lenticular lens 39 is characterized in that the degrees of diffusion are different in two directions that are orthogonal to each other over the surface on which a lens is formed.

Figure 12:
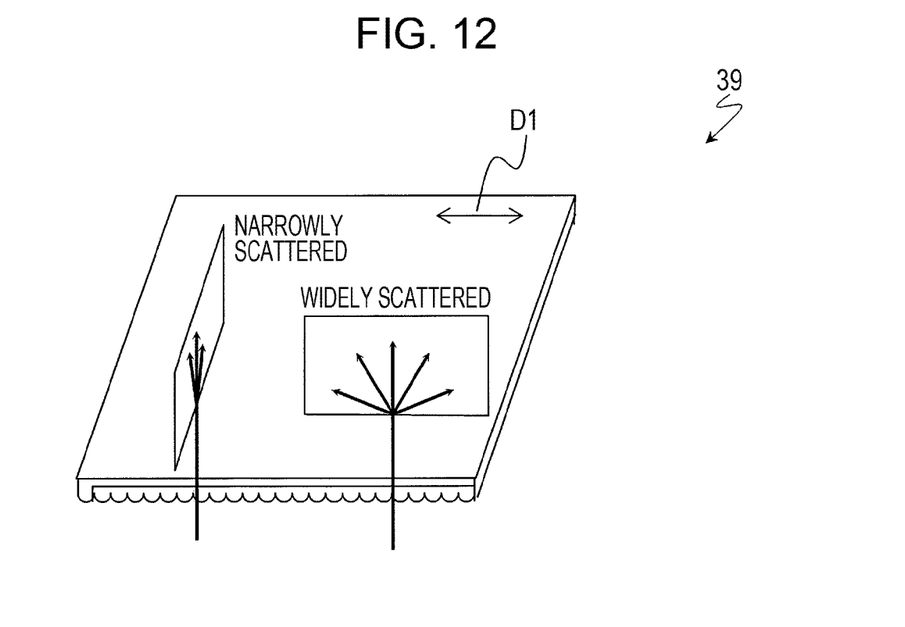
FIG. 12 illustrates light scattering characteristics of a lenticular lens (anisotropic light diffusion layer).

FIG. 12 illustrates the state of scattering of light in the lenticular lens 39. The lenticular lens 39 is formed by arranging multiple semicylindrical lenses that extend in the same direction without gaps interposed therebetween. As illustrated, the degree of diffusion of light (light scattering) is small in a direction in which the semicylindrical lenses extend, while the degree of diffusion of light (light scattering) is large in a direction D1 that is orthogonal to the direction in which the semicylindrical lenses extend.

As described above, a light diffusion structure that is anisotropic in terms of the degree of light diffusion can be used as a light diffusion layer. Herein, "anisotropic in terms of the degree of light diffusion" means that the degrees of light diffusion are different in two intersecting directions.

When an anisotropic diffusion layer such as a lens diffusion plate or a lenticular lens is used and a direction that is perpendicular to a side direction (in which the lens portion of the light-transmitting cover extends) of the liquid crystal panel is set as a diffusible direction D1, there is an advantage in that reduction of the luminance on the front surface is decreased compared with the case of isotropic scattering.

The degree of diffusion of light (light scattering intensity) of the lenticular lens 39 changes in accordance with a pitch of semicylindrical lenses. Thus, a lenticular lens 39 in which lenses are arranged at a pitch at which a desired degree of diffusion can be obtained may be used. The degree of diffusion of the lenticular lens 39 can also be controlled by changing the curvature of each semicylindrical lens. From the view point of manufacturability of the lenticular lens 39, however, it is preferable that a pitch of lenses be appropriately set so as to achieve a desired degree of diffusion.

Alternatively, a lens diffusion plate having a surface having a projection-and-depression configuration formed such that the degrees of light diffusion are different in two intersecting directions can be used as a light diffusion layer that is anisotropic in terms of the degree of light diffusion. A lens diffusion plate manufactured by Luminit LLC can be used as an example of the above lens diffusion plate. The lens diffusion plate manufactured by Luminit LLC has a micron-level projection-and-depression configuration on its surface and can diffuse light with its refraction effect. In the lens diffusion plate manufactured by Luminit LLC, the degrees of light diffusion are made different in the two intersecting directions by using the shape of the projection-and-depression configuration.

As described above, even in the case where a multi-display system is formed by using the liquid crystal display devices 300 according to the third embodiment, the frame area is made hard to visually perceive and preferable viewing angle properties can be obtained. In addition, by using the anisotropic diffusion layer, light from the backlight can be selectively diffused in required directions, thereby preventing the frontward luminance from being reduced.

Although the embodiments of the present invention have been described thus far, various configurations having a function of diffusing light can be used as a light diffusion layer. A microlens array or the like can be used as the light diffusion layer.

Figure 13:
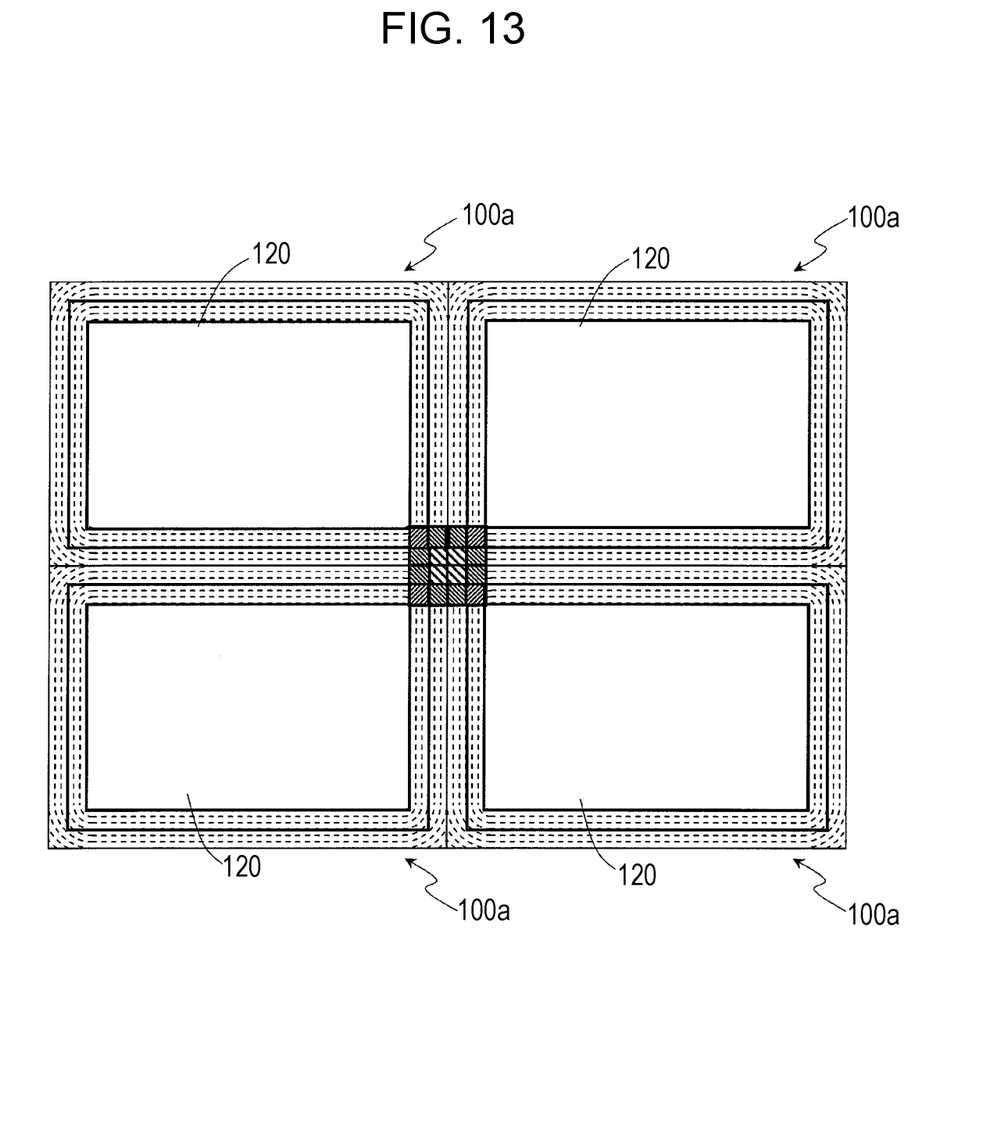
FIG. 13 illustrates a configuration in which liquid crystal display devices according to the first embodiment are arrayed in a matrix consisting of two devices in the vertical direction and two devices in the horizontal direction.

As illustrated in FIG. 13, when a multi-display system is formed by using liquid crystal display devices according to any of the embodiments of the present invention, the liquid crystal display devices may be arranged so as to be adjacent to each other not only in the horizontal direction but also in the vertical direction. In FIG. 13, four liquid crystal display devices 100a are arrayed in a 2 by 2 matrix. In this case, lens portions of the light-transmitting covers are also formed at positions corresponding to four corners of the panel. However, if needed, the configuration may be changed such that a lens is not formed at a position at which the lens is not adjacent to another panel.

The above configuration is described in International Publication No. 2010/070871 filed by the applicant. Also in this configuration, light from the backlight is diffused and thus images on display areas 120 reach a viewer's eye when viewed at an angle beyond the critical angle of the lens portions. Thus, borders between the liquid crystal display devices are prevented from becoming noticeable. In addition, since the refraction-index adjusting layer is provided, outdoor light can be prevented from being reflected.

The liquid crystal display device described thus far is preferably used in a multi-display system. When the liquid crystal display devices according to the embodiments of the present invention are applied to a multi-display system, frames at the borders between panels are made hard to visually perceive and images on liquid crystal display devices are continuously displayed. Even when the liquid crystal display device according to each embodiment of the present invention is viewed from an inclined direction at an angle of 60°, the frame areas are not visually perceived and preferable viewing angle properties are obtained.

INDUSTRIAL APPLICABILITY

The liquid crystal display devices according to the embodiments of the present invention are widely usable as various liquid crystal display devices such as a liquid crystal television, and particularly, preferably used in multi-display system having a large screen.

REFERENCE SIGNS LIST 10 liquid crystal display cell
10A display area
10F frame area
11 opposing board
12 TFT board
13 liquid crystal layer
16 sealing portion
18 pixel column
18' pixel electrode
20 light-transmitting cover
22 lens portion
24 flat portion
28 refraction-index adjusting layer
32 viewer-side polarizing plate
34 backlight-side polarizing plate
38 light diffusion layer
40 backlight
100 liquid crystal display device

The invention claimed is:

1. A liquid crystal display device comprising:
a liquid crystal display cell;
a light-transmitting cover disposed on a viewer side of the liquid crystal display cell, the light-transmitting cover including a lens portion, the lens portion being disposed so as to be superimposed on an edge portion of the liquid crystal display cell;
a backlight disposed on an opposite side of the liquid crystal display cell to the viewer side;
a light diffusion layer disposed so as to be positioned between the backlight and the light-transmitting cover; and
a refraction-index adjusting layer disposed between the liquid crystal display cell and the light-transmitting cover, the refraction-index adjusting layer fixing the liquid crystal display cell and the light-transmitting cover to each other, a refraction index difference between the refraction-index adjusting layer and the light-transmitting cover being smaller than a refraction index difference between the light-transmitting cover and air; wherein
in the light diffusion layer, degrees of light diffusion are different in two intersecting directions; and
the lens portion of the light-transmitting cover extends in a first direction along a surface of the liquid crystal display cell and the light diffusion layer is disposed such that one of the two intersecting directions in which the degree of light diffusion is larger is orthogonal to the first direction.

2. The liquid crystal display device according to claim 1, wherein
the light diffusion layer is positioned between the backlight and the liquid crystal display cell and attached to the liquid crystal display cell without interposing an air layer therebetween.

3. The liquid crystal display device according to claim 2, further comprising a pair of polarizing plates, one positioned on each of both sides of the liquid crystal display cell,
wherein the light diffusion layer is positioned between the backlight and the polarizing plate disposed on the backlight side of the liquid crystal display cell.

4. The liquid crystal display device according to claim 2, wherein a haze value of the light diffusion layer is 30% or larger but 90% or smaller.

5. The liquid crystal display device according to claim 2, wherein the light-transmitting cover has a slope portion that is continuous with the lens portion and the light-transmitting cover only covers a portion of the liquid crystal display cell.

6. The liquid crystal display device according to claim 2, wherein the light-transmitting cover is made of a silicone gel.

7. A multi-display system comprising a plurality of liquid crystal display devices each being the liquid crystal display device according to claim 2,
wherein the plurality of liquid crystal display devices are arranged adjacent to each other.

8. A liquid crystal display device comprising:
a liquid crystal display cell;
a light-transmitting cover disposed on a viewer side of the liquid crystal display cell, the light-transmitting cover including a lens portion, the lens portion being disposed so as to be superimposed on an edge portion of the liquid crystal display cell;
a backlight disposed on an opposite side of the liquid crystal display cell to the viewer side;
a light diffusion layer disposed so as to be positioned between the backlight and the light-transmitting cover; and
a refraction-index adjusting layer disposed between the liquid crystal display cell and the light-transmitting cover, the refraction-index adjusting layer fixing the liquid crystal display cell and the light-transmitting cover to each other, a refraction index difference between the refraction-index adjusting layer and the light-transmitting cover being smaller than a refraction index difference between the light-transmitting cover and air; wherein
the light-transmitting cover includes a slope portion that is continuous with the lens portion and the light-transmitting cover only covers a portion of the liquid crystal display cell.

9. The liquid crystal display device according to claim 2, wherein, in the light diffusion layer, degrees of light diffusion are different in two intersecting directions.

10. The liquid crystal display device according to claim 9, wherein the lens portion of the light-transmitting cover extends in a first direction along a surface of the liquid crystal display cell and the light diffusion layer is disposed such that one of the two intersecting directions in which the degree of light diffusion is larger is orthogonal to the first direction.

11. The liquid crystal display device according to claim 8, wherein the light diffusion layer is positioned between the backlight and the liquid crystal display cell and attached to the liquid crystal display cell without interposing an air layer therebetween.

12. The liquid crystal display device according to claim 8, further comprising a pair of polarizing plates, one positioned on each of both sides of the liquid crystal display cell,
wherein the light diffusion layer is positioned between the backlight and the polarizing plate disposed on the backlight side of the liquid crystal display cell.

13. The liquid crystal display device according to claim 8, wherein a haze value of the light diffusion layer is 30% or larger but 90% or smaller.

14. The liquid crystal display device according to claim 8, wherein the light-transmitting cover is made of a silicone gel.

15. A multi-display system comprising a plurality of liquid crystal display devices each being the liquid crystal display device according to claim 8, wherein the plurality of liquid crystal display devices are arranged adjacent to each other.

* * * * *